United States Patent Office 3,331,788
Patented July 18, 1967

3,331,788
REACTION PRODUCTS OF CERTAIN AMINES
AND CERTAIN POLYEPIHALOHYDRINS
Lyman E. Lorensen, Orinda, and Elliot Bergman, Modesto, Calif., assignors to Shell Oil Company, New York, N.Y., a corporation of Delaware
No Drawing. Filed July 6, 1965, Ser. No. 469,851
13 Claims. (Cl. 260—2)

This invention relates to a novel class of polymeric polyamines. More particularly, this invention relates to polymeric polyamines characterized by a basic poly(ethyleneoxy) structure to which are bonded a plurality of aminomethylene moieties. The compounds thus are polymeric polyether polyamines. Optionally, they may contain middle halogen and/or a minor proportion of hydroxyl.

These new polyamines are useful for a variety of purposes, acting as curing agents for polyepoxide resins, inhibiting oxidation of lubricating oils, and being effective microbicides.

The polyamines of this invention are characterized by the presence of at least three aminomethylene moieties (inclusive of substituted methylene as hereinafter described), each bonded to different ethyleneoxy moieties (inclusive of substituted ethylene as hereinafter described), the amino moieties each containing at least four carbon atoms.

The character of these new polyamines will be more apparent from the manner in which they are prepared. They are prepared by reacting a primary or secondary hydrocarbon amine containing at least four carbon atoms (as hereinafter described), with a polyepihalohydrin, or an epoxide thereof, to bond at least three amino moieties to the polyepihalohydrin structure. Five types of polyepihalohydrins are suitable as precursors:

(1) Alcohol (monohydric, ROH; polyhydric, $R(OH)_n$) initiated, which may be represented by the formula:

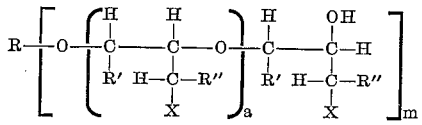

wherein R is the residue of the alcohol, preferably lower alkyl (preferably containing no more than six carbon atoms, and still more preferably, no more than four carbon atoms, and may be substituted by $n-m$ hydroxyl, R' is hydrogen, lower alkyl or is —CHR''X, R'' is hydrogen or lower alkyl, X is middle halogen—that is, bromine or chlorine, $n$ is an integer of at least one, $m$ is an integer of at least one, but not exceeding $n$, and $a$ is an integer which is the number of the moieties within the parentheses occurring within one of the moieties, $m$ in number, enclosed in brackets, with the proviso that although $a$ may be zero in any one of the bracketed moieties, the molecule must contain at least one of the moieties within the parentheses. Where R is the residue of a monohydric alkyl alcohol, $n$ thus is one, $m$ is one and $a$ is at least two. Where R is the residue of a dihydric alkyl alcohol, $n$ is two, $m$ is one or two, $a$ is at least two or one, respectively. Because of the reactivity of the hydroxyls of the alcohol, $m$ ordinarily is two. In one of the two bracketed moieties, $a$ is at least one; it may be zero in the other, or it may be one or greater. $a$ in one bracketed moiety may be the same as $a$ in the other (except that both cannot be zero), or it may be different. When $m$ is one, then R is hydroxyalkyl, since $n-m=1$. Where R is the residue of a trihydric alkyl alcohol, $n$ is three, $m$ is one, two or three, $a$ is at least one. Because of the difference in reactivity of the hydroxyls of the alcohol, depending upon their positions on the molecule, the values of $m$ and $a$ cannot be predicted. In the case of glycerol, the two hydroxyls bonded to primary carbon atoms ordinarily are of about the same reactivity (as in the dihydric alcohol) and are more reactive than the hydroxyl bonded to the secondary carbon atom. Consequently, when glycerol is used as the initiator, $m$ ordinarily is predominantly two, R being hydroxyalkyl $(n-m=1)$. In one of the two bracketed moieties, $a$ is at least one; it may be zero in the other, or it may be one or greater. $a$ in one bracketed moiety may be the same as $a$ in the other, or it may be different (both $a$'s cannot be zero, however). In trimethylolethane, the reactivity of the three hydroxyls is somewhat different. In pentaerythritol, the reactivity of the four hydroxyls tends to be about the same, so that $m$ ordinarily is four; $a$ usually is the result of statistical distribution.

(2) Water-initiated, which may be represented by the formula:

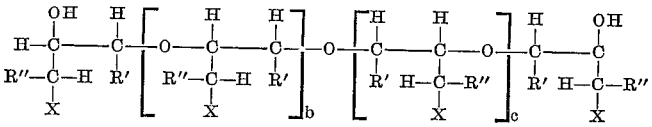

wherein $b$ and $c$ are integers, $b$ being at least one, and the other symbols have the respective meanings already assigned. It is to be noted that water acts as a difunctional initiator.

(3) The corresponding epoxides wherein from one to all of the halohydrin terminal groups,

CHXR''—CHOH—CHR'— have been modified to the corresponding epoxide groups,

(4) Acid catalyzed, without initiator. The terminal moieties of this class of polyepihalohydrins has not been certainly ascertained. One is believed to be olefinic in character, with the other believed to be halohydrin in character. These polymers, like those of types 1 through 3 above, are characterized by the repeating moiety:

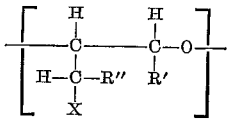

According to the invention, the polyamines prepared from these polyepihalohydrins, like the polyamines prepared from the other polyepihalohydrins, must contain at least three amino moieties.

(5) Polyepihalohydrin epoxides of class 3 above which have been treated with water and an acid under conditions such as to hydrate the terminal carbon atoms—adding hydroxyl thereto. At least one of the terminal moieties in this case has the formula: —CH(OH)—CHR''(OH).

(6) Catalyzed, by other than acid catalysts, as in the polymers of U.S. Patents 3,058,923 and 3,065,188. Here, also the terminal moieties are not known with certainty, but the polymers are characterized by the repeating moiety described for class 4, above.

When the amine is reacted with such polyepihalohydrins, it first reacts with halogen bonded to terminal carbon, then with halogen of the halomethylene moieties. When the amine is reacted with epoxides of such polyepihalohydrins, it first reacts with the epoxide, opening the ring, the amino bonding to the terminal carbon, with hydroxyl being bonded to the immediately adjacent carbon. The final terminal structure is the same in both cases. In the polyamines of the invention, amine must not only react as above indicated, but at least one of the halogen atoms of the halomethylene moieties must be replaced by amino. If terminal halogen and/or epoxide is not present, then at least three of the halomethylene halogens must be replaced by amino.

Where R' represents a halomethylene moiety, and the amine precursor is a primary amine, the resulting polyamine ordinarily is at least in part of tertiary cyclic character, the two halogens on the adjacent halomethylene moieties reacting in part with the amino moiety, thus,

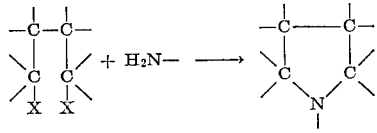

Polyepihalohydrins and their epoxides of the foregoing classes are all known materials. Thus, epihalohydrins of class 1 are described in U.S. Patent 2,891,073, and in application Ser. No. 381,262, filed July 8, 1964. Epihalohydrins of class 2 are described in British Patent 898,306 and U.S. Patents 2,891,073 and 3,058,921. The corresponding epoxides, class 3, are described in U.S. Patents 2,891,073 and 3,058,921, and in application Ser. No. 381,262. The polymers of class 4 are described in British Patent 477,843, U.S. Patents 2,599,799, 2,871,219 and 3,158,580. Preparation of glycol terminated polyepihalohydrins of class 5 has already been described.

As is disclosed in these references, polyepihalohydrins of various molecular weights are known, varying from those in which $a$ (average) is 1 (average molecular weight about 300) to those in which $a$ (average) is 50 (average molecular weight about 4500) or even greater, as in the polyepihalohydrins of U.S. 3,158,580, in which the average molecular weight is of the order of 100,000 or greater ($a$ average)=about 1000—1100), for example, up to an average molecular weight of 1,000,000. As will be demonstrated in the actual examples of polyamines described hereinafter, a polyepihalohydrin of molecular weight of the order of 800,000 has been used for the preparation of polyamines of this invention.

It will be appreciated that in the preparation of such polymers, under any given set of preparative conditions, polymers of varying molecular weight will be formed. When molecular weight is indicated in this specification, the average molecular weight of the particular polymer, or fraction of polymeric product, is meant.

Preferred precursors for the preparation of the polyamines of this invention are the polyepi-chloro- and -bromo-hydrins and corresponding epoxides initiated by water or a polyol. In the case of the water-initiated polyepichlorohydrins and epoxides the polyamines of the invention have the formula:

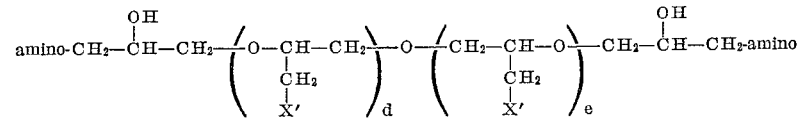

wherein $d$ and $e$ are integers, $d+e$ being at least 1, and X' represents middle halogen or amino, at least one of X' being amino.

The polyamines prepared from the corresponding glycol-initiated compounds have the formula:

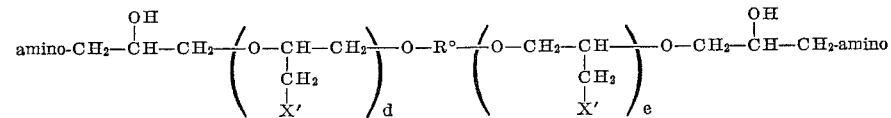

Other preferred amines are those prepared from poly (1,4-dihalo-2,3-epoxybutanes) or the corresponding epoxides of U.S. Patent 3,065,188. These polyamines are characterized by the structural moieties

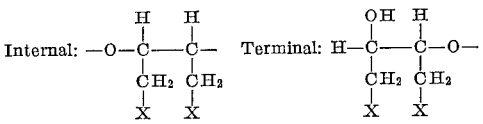

wherein X is middle halogen. These moieties will of course be joined together by the residue of the particular initiator used to prepare them.

As has already been pointed out, when the amine precursor is a primary amine, the product ordinarily contains not only secondary amino moieties, from reaction of the amine with one halogen, but also cyclic tertiary amine moieties, from reaction of the amine with two of the halogens on adjacent halomethylene groups.

A preferred class of polyamines of this invention consists of those in which more than half of the halogen content of the precursor polyepihalohydrin has been replaced by amino, for these polyamines have particularly high microbicidal activity. Still more preferably, essentially all of the halogen is replaced by amino, since the resulting polyamines appear to exhibit optimum microbicidal activity. This is not to say that the polyamines of the invention containing substantial amounts of halogen are of less interest, however. It has been found that the halogen content has an effect on the mammalian toxicity of the polyamine. In general, lower mammalian toxicity appears to be associated with higher halogen content. While lower microbiological activity also appears to be associated with higher halogen content, polyamines of the invention are such powerful microbiocides that in some cases, over-all usefulness would dictate use of a microbiologically less active polyamine because of its greater safety, the lesser activity still being sufficient for the intended purpose.

In the polyamines of this invention, the amino moieties are either secondary or tertiary in character—formed by reaction of the polyepihalohydrin or epoxide precursor with a primary or secondary amine, respectively, except in the case of polyamines formed from poly(1,4-dihalo-2,3-epoxybutanes), and primary amines, where the polyamine may consist in part of cyclic tertiary amino configuration.

Essentially any primary hydrocarbon amine or secondary di(hydrocarbon) amine of at least four carbon atoms is suitable as the precursor. The hydrocarbon moiety or moieties can be aliphatic, including cycloaliphatic, in character, or aromatic in character, or of mixed character. The aliphatic moieties can be of either straight-chain or branched-chain configuration. The aliphatic moieties can be saturated or olefinically unsaturated, but preferably are free from acetylenic unsaturation. Suitable classes and species of amines that are suitable thus include the following. Alkylamines and dialkylamines, including n-, sec-, tert- and iso-butylamines, the isomeric pentylamines, hexylamines, octylamines, decylamines, dodecylamines including the commercial $C_{12}$ primary amines marketed commercially under the tradename Primene 81R, and the commercial long-chain (t-$C_{18-22}$) primary amines marketed under the tradename Primene JM-T. The amine suitably can be one of the secondary amines corresponding to the foregoing primary amines, in which each of the alkyl groups is the same, or is different—as in the cases, for example, of methyl t-octylamine, methyl butylamine, and the like. Alkenylamines and di(alkenyl)amines, such as allylamine, diallylamine, methallylamine, crotylamine, and the like, are suitable; so are mixed alkenyl, alkylamines, such as propyl allylamine, t-octyl allylamine, methyl crotylamine, and the like. Mono- and di-cycloalkyl-, mono- and di-cycloalkenyl- and mixed amines, such as cycloalkyl alkylamines, and the like, are suitable, typical representative species being cyclohexylamine, methyl cyclohexylamine, cyclopentylamine, dicyclopentylamine, cyclohexenylamine, and ethyl cyclopentylamine. The aromatic primary amines, and di-aromatic secondary amines are suitable. Suitably the aromatic group(s) can be substituted by alkyl. Typical species of these amines include phenylamine, diphenylamine, di-(p-methylphenyl)amine, 2,4-dimethylphenylamine and the like. Mixed alkylamines, such as methyl phenylamine, also are suitable. Another suitable class of amines are those in which one or both hydrocarbon groups is aralkyl, amines such as benzylamine, dibenzylamine, methyl benzylamine, phenethylamine, alpha-methylbenzylamine, phenyl benzylamine, cyclohexyl benzylamine, and the like.

The new polyamines are prepared by mixing the polyepihalohydrin or epoxide with an excess of the amine, heating the mixture to a moderately elevated temperature, then holding the mixture at that temperature for a sufficient period of time to effect the desired degree of replacement of halogen by amino. An often convenient procedure is to supply sufficient of the amine to react with the polyepihalohydrin or epoxide, plus sufficient excess to act as acceptor for hydrogen halide formed during the reaction, plus sufficient additional excess to act as solvent. In such operation, it is desirable to supply at least twice the amount of amine required theoretically by the number of atoms of halogen (and epoxy moieties, if present). Ordinarily, it will not be found of sufficient additional advantage to employ in excess of about six times the amount of amine theoretically required, and in most cases, use of from three to five times the theoretical amount of amine will be found most desirable. It may in some cases be found desirable to supply an additional solvent. Suitable solvents are those in which the reactants have at least some solubility, and which are inert in the reaction mixture. Suitable solvents include lower alkanols, such as methyl, ethyl, n- and isopropyl, butyl and sec-butyl alcohols, lower ketones, such as acetone, methyl ethyl ketone and, methyl isobutyl ketones, ethers, such as tetrahydrofuran and dioxane, nitromethane, aromatic or normally liquid aliphatic hydrocarbons, such as benzene, toluene, xylene, hexane, cyclohexane, liquid hydrocarbon fractions, and the like.

It has been found that replacement of halogen by amino in the polyepihalohydrin and epoxide precursors is readily effected at temperatures above about 120° C. with the extent of replacement being a direct function of time, the rate of replacement being a direct function of temperature. Preferably, temperatures of the order of about 160° C. are employed, for at these temperatures the rate of replacement is reasonably rapid, yet is not so rapid as to make difficult termination of the reaction when the desired degree of reaction has been effected. Temperatures in excess of about 200° C. preferably avoided—to minimize undesirable side reactions, to insure that decomposition of components of the reaction mixture does not occur, and to reduce the pressure required to maintain the reactants as liquids. Temperatures of the order contemplated are above the boiling points of most amines. Since it is desirable that the reactants be in liquid phase, it consequently is usually necessary to conduct the reaction under such superatmospheric pressure as will maintain the amine as a liquid. The pressure may be selected to permit refluxing of the amine, if desired, although this ordinarily will not be necessary. To establish a criterion for estimating the time required to effect a desired degree of replacement of halogen by amino, it has been found that essentially complete replacement is ordinarily accomplished in about 48 hours, at a reaction temperature of about 150° C.

The polyamine product is worked up conveniently in most cases by first treating the final reaction mixture with dilute aqueous caustic (sodium hydroxide is suitable) to spring the amine from the hydrohalide, then treating the resulting mixture with a suitable solvent, such as ether, to extract and separate the polyamine from the aqueous phase. The ether phase then is dried, and the ether stripped—for example, at 100° C. and 0.1 torr pressure—to yield the product.

The molecular weight range of the product of course depends primarily upon the molecular weight range of the precursor polyepihalohydrin or epoxide. The desired molecular weight range of the product thus can be accomplished by appropriate choice of precursor. However, it is possible to obtain a product of narrower molecular weight range by appropriate treatment of a product of broader molecular weight range—techniques such as distillation under vacuum, for example, molecular distillation, chromatography, or treatment with selective solvents, are suitable.

The following examples set forth preparation of specific polyamines of this invention:

EXAMPLE I

Polyamines of epihalohydrins or epoxides thereof in which a part of the halogen was retained were prepared as follows:

An excess of the amine was mixed with the polymer and the mixture held at a moderately elevated temperature for a number of hours. The mixture then was cooled, treated with sufficient dilute aqueous sodium hydroxide solution to spring the amine from the hydrohalide. The polyamine polymer was then extracted from the reaction mixture using ether as selective solvent, then the ether was stripped away to yield the desired polyamine.

The polymer used in Runs ($a$) through ($f$) following was a diglycidyl polyepichlorohydrin prepared by water-initiated polymerization of epichlorohydrin, then epoxidizing the resulting polymer, according to U.S. Patent 3,058,921. The polymer had the formula:

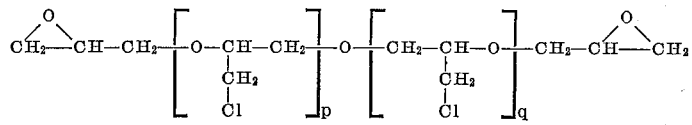

where $p$ and $q$ are integers, $p+q=$about 7. It had an average molecular weight of 800, contained 32.1% by weight of chlorine. For brevity in the following table, this polymer will be referred to as F. In Run ($g$) following the polymer ($F_1$) was prepared in the same manner, but had about twice the average molecular weight.

| Run | Polymer | Amine | Moles amine/ moles Cl plus epoxide | Solvent | Reaction Temperature, °C. | Reaction Time, hours | Neutralization Temperature, °C. |
|---|---|---|---|---|---|---|---|
| (a) | F | n-Butyl | 4/1 | Benzene | 78 | 44 | 80 |
| (b) | F | Tert-octyl | 2/1 | do | 115 | 50 | 115 |
| (c) | F | Primene 81R | 4/1 | None | 150 | 49 | 70–30 |
| (d) | F | do | 2/1 | Benzene | 120 | 50 | 120 |
| (e) | F | Tert-octyl | 4/1 | None | 150 | 43 | 20 |
| (f) | F | do | 2/1 | Benzene | 115 | 50 | 115 |
| (g) | F₁ | Primene JMT | 5/1 | None | 150 | 58 | 20 |

EXAMPLE II

The following listed polyamines of the invention which contain essentially no halogen—i.e., prepared from polyepichlorohydrin, or an epoxide thereof, with essentially all of the chlorine replaced by amino—have been prepared. The procedure: the amine, 200–400 percent excess, and the polymer were mixed and reacted at approximately 150° C., under moderate superatmospheric pressure depending upon the particular amine used, for 48 hours. The mixture then was mixed with sufficient dilute sodium hydroxide solution to spring the amine hydrochloride and the resulting mixture extracted with ether. The ether phase was separated, dried, and the ether stripped at 100° C., 0.1 torr pressure.

The polyamines:

| Polymer [1] | Amine | Characteristics of Polyamine |
|---|---|---|
| A | Tert-octyl | Colorless viscous liquid. |
| B | do | Clear yellow viscous liquid. |
| C | Decyl | Amber solid. Soluble in ethanol. |
|  | Nonyl | Yellow solid. |
|  | Undecyl | Dark brown solid. |
| D | t-Octyl | Amber viscous liquid. |
| E | do | Viscous yellow liquid. |
|  | Heptyl | Light yellow solid. |
|  | Undecyl | Yellow solid. |
|  | Tridecyl | Amber solid. |
|  | Decyl | Amber solid. Soluble in ethanol. Insoluble in acetone. |
|  | Octyl | Yellow solid. |
|  | Nonyl | Do. |
|  | Dodecyl | Yellow-green solid. |
| F | t-Octyl | Yellow viscous liquid. |
|  | t-Butyl | Clear yellow solid. |
|  | Cyclohexyl | Amber solid. |
|  | Beta-phenethyl | Clear amber solid. |
|  | Isopropyl | Amber solid. Soluble in water. |
|  | Methyl t-octyl | Brown viscous liquid. |
|  | Methyl butyl | Yellow solid. |
| G | t-Octyl | Yellow very viscous liquid. |
|  | Dodecyl | Amber solid. Soluble in methyl ethyl ketone. |
|  | Decyl | Do. |
|  | Octyl | Amber solid. |
|  | Heptyl | Light yellow solid. |
|  | Nonyl | Yellow solid. |
|  | Undecyl | Do. |
|  | Tridecyl | Amber solid. |
| H | t-Octyl | Yellow very viscous liquid. |
| I | do | Do. |
| J | do | Amber solid. |
|  | Octyl | Do. |
| K | do | Do. |
|  | t-Octyl | Very dark amber solid. |
| L | Aniline | Amber rubbery solid. Soluble in warm acetone. Insoluble in water. |
|  | t-Octyl | |
|  | n-Octyl | Dark brown tacky solid. Soluble in ether and methyl ethyl ketone. |

[1] The polymers identified by the letters were as follows: A=water-initiated polyepichlorohydrin, molecular weight 300; B=water-initiated polyepichlorohydrin, molecular weight 350; C=water-initiated polyepichlorohydrin diepoxide, molecular weight 300; D=water-initiated polyepichlorohydrin diepoxide, molecular weight 350; E=water-initiated polyepichlorohydrin diepoxide, molecular weight 550; F=water-initiated polyepichlorohydrin diepoxide, molecular weight 800 (this is the polyepichlorohydrin diepoxide described in more detail in Example I); G=water-initiated polyepichlorohydrin diepoxide, molecular weight 1,000; H=glycerol-initiated polyepichlorohydrin, molecular weight 1,100; I=glycerol-initiated polyepichlorohydrin, molecular weight 2,000; J=water-initiated polymer of 1,4-dichloro-2,3-epoxybutane, molecular weight 350; K=water-initiated polymer of 1,4-dichloro-2,3-epoxybutane, molecular weight 400; L=polyepichlorohydrin, molecular weight 800,000.

Polyamines of the invention are effective curing agents for polyepoxides, such as the glycidyl ethers of 2,2-bis(4-hydroxyphenyl)propane, to form insoluble, infusible products. For this purpose they are used in the conventional manner, being added to and mixed with the resin precursor in equivalent proportions, and the mixture heated to effect the cure.

Polyamines of the invention also are oxidation inhibitors for lubricating oils. Thus, the polyamine of Example (c), of Example I, was tested in the Dornte oxidation test. It extended the time for absorption of a given quantity of oxygen by a lubricating oil formulation from 2 hours (no polyamine) to about 15 hours. The polyamine prepared from polymer F and t-octadecylamine gave about the same degree of oxidation inhibition. Polyamines of the invention prepared from secondary amines were even more effective, the polyamine prepared from polymer F and dilauryl amine extending the time for absorption of the oxygen to about 40 hours, and the polyamine prepared from polymer F and methyl octadecylamine extending the time for absorption of the oxygen to about 75 hours.

Polyamines of the invention have been found to be effective microbicides and fungicides. Thus many of the polyamines of Example II have been tested and found effectively control such microorganisms as various strains of *Staphylococcus aureus*, *Diplococcus pneumoniae*, beta-streptococcus, alpha-streptococcus, *Escherichia coli*, *Klebsiella pneumoniae*, *Pseudomonas aeroginosa*, as well as *Streptococcus fecalis*, *Bacillus subtilis*, *Listeria monocytogenes*, *Erwinia carotovora*, *Mycobacterium avium*, *M. smegmatis*, *M. phlei*, *Proteus vulgaris*, *Salmonella typhimurium*, *S. schottmuelleri*, *S. pullorum*, *Shigella flexneri*, *Candida albicans*, *C. mycoderma*, *Saccharomyces niger*, *Penicillium citrinum*, *Epidermophyton flocossum*, *Trichophyton tonsurans*, Newcastle disease virus and green algae of the Chlorella type.

Salts of these polyamines also are useful compounds, in general having properties similar to the corresponding amines. From the standpoint of microbicidal use, the salts in some cases may be preferred to the corresponding amines, since the salts may have more useful solubility properties as regards water, organic solvents or other carriers used in the application and administration of microbicides. Suitable salts include those of inorganic acids, such as the halogen acids, particularly the hydrohalic acids, in particular hydrochloric acid and hydrobromic acid, sulfuric acid, phosphoric acid and boric acid. Both complete salts and partial salts are contemplated. The salts of organic acids also are suitable, examples of suitable acids being the aliphatic mono- and polycarboxylic acids, the alkane mono- and dicarboxylic acids of up to ten carbon atoms being preferred, including those which are substituted—as for example, halogenated acids, hydroxy-substituted acids, and the like—alkane and aryl sulfonic acids, phosphonic acids, phosphinic acids, phosphorous acid and its partial esters and the like. Examples of specific acids include acetic acid, succinic acid, lactic acid and gluconic acid. The salts can be prepared in the conventional manner. In the case of the hydrogen halide salts, when polyamines of the invention are prepared in the manner which has been described, the immediate product of the preparation in many cases is the hydrogen halide salt—at least in part.

We claim as our invention:

1. The polyamine product resulting from reaction of
   (a) polyepihalohydrin of the formula:

$$\left(HO\right)_{n-m}-R-\left[-O-\left[\begin{array}{cc}H & H \\ -C-R' & H-C-R'' \\ & X \end{array}\right]_a -O-\begin{array}{cc}H & OH \\ C-R' & C-H \\ H-C-R'' & \\ X & \end{array}\right]_m$$

wherein:
   R is alkyl of from 1 to 6 carbon atoms;
   R' is hydrogen, alkyl of from 1 to 6 carbon atoms or —CHR''X;
   R'' is hydrogen or alkyl of from 1 to 6 carbon atoms;
   X is chlorine or bromine;
   n is an integer from 1 to 4;
   m is an integer from 1 to 4;
   a is an integer of up to 10,000 which is the number of moieties within the parentheses occurring within one of the moieties, m in number, enclosed in brackets, with the proviso that while a may be zero in any one of the bracketed moieties the molecule must contain at least one of the moieties within the parentheses,
   (a') such a polyepihalohydrin wherein at least one of the terminal halohydrin groups has been converted to the corresponding epoxide group, or
   (a'') such a polyepihalohydrin wherein at least one of the terminal halohydrin groups has been converted to the corresponding epoxide group and at least one of said epoxide groups has been converted by hydration to a vic-diol group, and
   (b) a primary (hydrocarbon)amine or secondary di-(hydrocarbon)amine free from acetylenic unsaturation and containing from 4 to 22 carbon atoms in each hydrocarbon group,
said reaction being effected by heating at a temperature of from about 120° C. to about 200° C. a mixture of the polyepihalohydrin and the amine, the amine being present in excess of the amount theoretically required to replace the halogen in the polyepihalohydrin, said heating being continued for sufficient time for at least three halogen atoms of the polyepihalohydrin to be replaced by amino moieties derived from the amine.

2. The polyamine product according to claim 1 which has been further treated with dilute aqueous caustic to spring polyamine from any polyamine hydrohalide in the product according to claim 1.

3. A polyamine product according to claim 1 wherein the polyepihalohydrin has a molecular weight of about 800, X therein being chlorine, and the amine is an alkylamine.

4. The polyamine product according to claim 3 which has been further treated with dilute aqueous caustic to spring polyamine from any polyamine hydrohalide in the product according to claim 3.

5. The polyamine product resulting from reaction of
   (a) a polyepihalohydrin of the formula:

$$\begin{array}{c}OH\ H \\ H-C-C \\ R''-C-H\ R' \\ X\end{array}\left[\begin{array}{cc}H & H \\ -O-C-C \\ R''-C-H\ R' \\ X\end{array}\right]_b\left[\begin{array}{cc}H & H \\ -O-C-C-O \\ R'\ H-C-R'' \\ X\end{array}\right]_c\begin{array}{c}H\ OH \\ -C-C \\ R'\ H-C-R'' \\ X\end{array}$$

wherein:
   R' is hydrogen, alkyl of from 1 to 6 carbon atoms or —CHR''X;
   R'' is hydrogen or alkyl of from 1 to 6 carbon atoms;
   X is chlorine or bromine;
   b and c are each integers, b being at least 1, with b+c not exceeding 10,000,
   (a') such a polyepihalohydrin wherein at least one of the terminal halohydrin groups has been converted to the coresponding epoxide group;
   (a'') such a polyepihalohydrin wherein at least one of the terminal halohydrin groups has been converted to the corresponding epoxide group and at least one of said epoxide groups has been converted by hydration to a vic-diol group, and
   (b) a primary (hydrocarbon)amine or secondary di-(hydrocarbon)amine free from acetylenic unsaturation and containing from 4 to 22 carbon atoms in each hydrocarbon group,
said reaction being effected by heating at a temperature of from about 120° C. to about 200° C. a mixture of the polyepihalohydrin and the amine, the amine being present in excess of the amount theoretically required to replace the halogen in the polyepihalohydrin, said heating being continued for sufficient time for at least three halogen atoms of the polyepihalohydrin to be replaced by amino moieties derived from the amine.

6. The polyamine product according to claim 5 which has been further treated with dilute aqueous caustic to spring polyamine from any polyamine hydrohalide in the product according to claim 5.

7. A polyamine product according to claim 5 wherein the polyepihalohydrin has a molecular weight of about 800, X therein being chlorine, and the amine is an alkylamine.

8. The polyamine product according to claim 7 which has been further treated with dilute aqueous caustic to spring polyamine from any polyamine hydrohalide in the product according to claim 7.

9. The polyamine product resulting from reaction of
   (a) a catalyzed homopolymer of an epihalohydrin, said polymer being characterized by the essential structural configuration $$\left[\begin{array}{cc}H & H \\ -C-C-O- \\ H-C-R''\ R' \\ X\end{array}\right]_e$$

wherein:
   R is alkyl of from 1 to 6 carbon atoms;
   R' is hydrogen, alkyl of from 1 to 6 carbon atoms or —CHR''X;
   R'' is hydrogen or alkyl of from 1 to 6 carbon atoms;
   X is chlorine or bromine;
   e is an integer of from 3 to 10,000 and
   (b) a primary (hydrocarbon)amine or secondary di-(hydrocarbon)amine free from acetylenic unsaturation and containing from 4 to 22 carbon atoms in each hydrocarbon group,
said reaction being effected by heating at a temperature of from about 120° C. to about 200° C. a mixture of the polyepihalohydrin and the amine, the amine being present in exces of the amount theoreticaly required to replace the halogen in the polyepihalohydrin, said heating being continued for sufficient time for at least three halogen atoms of the polyepihalohydrin to be replaced by amino moieties derived from the amine.

10. The polyamine product according to claim 9 which has been further treated with dilute aqueous caustic to spring polyamine from any polyamine hydrohalide in the product according to claim 9.

11. A salt of the polyamine of claim 2 with a hydrohalic acid, sulfuric acid, phosphoric acid, boric acid, an alkane monocarboxylic acid of up to 10 carbon atoms, or an alkane dicarboxylic acid of up to 10 carbon atoms.

12. A salt of the polyamine of claim 6 with a hydrohalic acid, sulfuric acid, phosphoric acid, boric acid, an alkane monocarboxylic acid of up to 10 carbon atoms, or an alkane dicarboxylic acid of up to 10 carbon atoms.

13. A salt of the polyamine of claim 10 with a hydrohalic acid, sulfuric acid, phosphoric acid, boric acid, an alkane monocarboxylic acid of up to 10 carbon atoms, or an alkane dicarboxylic acid of up to 10 carbon atoms.

No references cited.

ALEX MAZEL, *Primary Examiner.*

JOSEPH A. NARCAVAGE, *Assistant Examiner.*